No. 704,815. Patented July 15, 1902.
J. E. CHARON.
FILTER.
(Application filed Dec. 11, 1900.)
(No Model.)
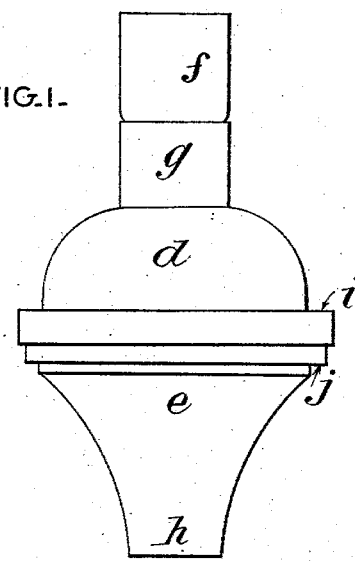
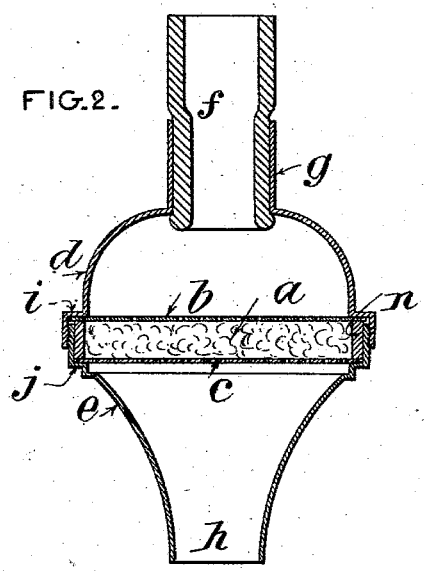
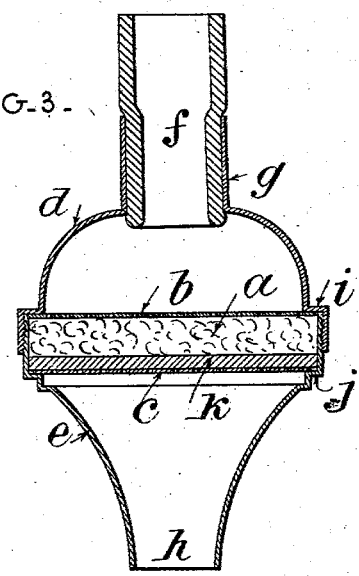
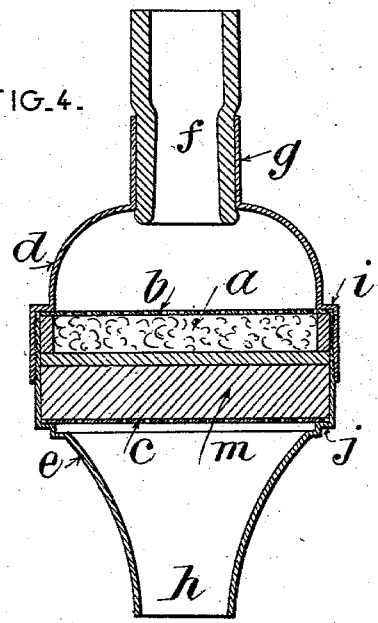
Witnesses.
Inventor
Jules E. Charon
By H. B. Willson & Co.
Attorneys

UNITED STATES PATENT OFFICE.

JULES EDOUARD CHARON, OF PARIS, FRANCE.

FILTER.

SPECIFICATION forming part of Letters Patent No. 704,815, dated July 15, 1902.

Application filed December 11, 1900. Serial No. 39,529. (No model.)

*To all whom it may concern:*

Be it known that I, JULES EDOUARD CHARON, manufacturer, a citizen of the Republic of France, residing at Montreuil sous Bois, 40 Boulevard de l'Hôtel de Ville, Paris, in the Republic of France, have invented certain new and useful Improvements in Economic Filters, of which the following is a specification.

My invention relates to a filter intended to be adapted to the end of conduits of water under pressure—as for example, on the cocks for the delivery of water in houses; and it consists in the construction and arrangement of parts, as will be hereinafter described, and particularly pointed out in the claim.

I have shown in the accompanying drawings several forms of my invention.

Figure 1 is an elevation, and Fig. 2 a vertical section through the center of Fig. 1, of one form of my invention; and Figs. 3 and 4 show in vertical section two other forms of my invention.

The filter for which I desire to obtain Letters Patent comprises, essentially, a layer of glass wool or spun-glass $a$, held, for example, between two pieces of wire-gauze or perforated plates $b$ and $c$ within a metal casing. The latter is preferably formed of two parts $d$ $e$, put or soldered together, each being provided with a tube. By means of a rubber connection $f$ one of the said tubes (that lettered $g$) can be connected to a conduit of water under pressure. The other tube $h$ affords delivery of the filtered water. In order to maintain the grates $b$ and $c$ and the filtering-layer easily in position, the flanges $i\,j$, in projection toward the interior, are formed on the wall of the parts $e$ and $d$ of the said casing. The grate $c$ rests on the flange $j$. The glass wool is placed above the said grate and is pressed by the grate $b$, which rests on the flange $i$. The second part $d$ of the casing, which fits onto the other part, prevents upward movement of the grate $b$. A rubber ring $n$, arranged between the wall of the casing and the spun glass, may be used to support the perforated partition $b$, and thus prevent the formation along the wall of too-easy passages for the liquid. The parts $d$ and $e$ may be finally fixed together and a water-tight joint formed between the same by means of soldering. The rubber connection $f$ may be so fixed within the tube $g$ as to resist the pressure of the water.

The filter thus formed in a most economic manner can be fitted by any unskilled person on any water-delivery cock. It gives a good discharge without requiring high pressure on the water, and it can be applied, for example, to the cock of a vessel in which the column of water is comparatively feeble.

The cleaning of the filter is easily and quickly operated by turning it upside down on the conduit or cock on which it is fitted.

In Fig. 3 I have shown a filter formed, as hereinbefore, of a casing in two parts $d$ and $e$, provided, respectively, with the tubes $g$ and $h$ and of a filtering-partition held within the said casing between two grates $b$ and $c$, which rest against the flanges $i$ and $j$ of the wall; but in this case the filtering-partition is composed of a layer of glass wool $a$ and of a disk of felt $k$, the latter being located below the former.

Fig. 4 shows another form of my invention in which the filtering-partition is formed by a layer of spun glass $a$ at the upper part, an intermediate disk of felt $k$, and a lower disk of compressed charcoal $m$.

It is easy to clean the two latter forms of filters in the same manner as the one first described by causing a current of clear water to flow through the same in the inverse direction to that in which filtering usually takes place—that is to say, in the direction from $h$ to $g$.

It must be understood that the dimensions, forms, and materials of the constitutive parts of the filter shown in the drawings may be varied or modified without interfering with the principle of the invention.

I claim—

In a filter, the combination with the casing, the lower section thereof having an outlet-tube at its lower portion, the upper portion of the section provided with a vertical upwardly-extended right-angular surrounding flange, a perforated grating mounted on one portion of said flange with a suitable packing arranged above the same and coacting therewith, a rubber ring interposed between one portion of the packing and the upwardly-extended wall of said lower section, and a perforated grating mounted on the surrounding upper-edge portion of said ring and the upper packing; of the upper section of the casing having an inlet-tube in line with the outlet-tube and the lower portion of said upper section having a downwardly-extended right-angular surrounding flange to coact with the vertical upwardly-extended flange and with the upper grating on the ring and upper packing whereby to press and hold the packings and gratings between the two sections of the casing, substantially as specified.

In testimony that I claim the foregoing as my invention I have signed my name in presence of two subscribing witnesses.

JULES EDOUARD CHARON.

Witnesses:
CAMILLE BLÉTRY,
EUGÈNE WATTIER.